United States Patent [19]
Williams et al.

[11] Patent Number: 6,141,531
[45] Date of Patent: Oct. 31, 2000

[54] LOCAL WIRELESS COMMUNICATION SYSTEM WITH EXTERNAL COMMUNICATIONS LINK

[75] Inventors: Bill G. Williams, Waco; Jerry W. Petermann, Pflugerville, both of Tex.

[73] Assignee: Direct Wireless Corporation, Irving, Tex.

[21] Appl. No.: 09/062,012

[22] Filed: Apr. 17, 1998

Related U.S. Application Data

[63] Continuation-in-part of application No. 08/979,676, Nov. 26, 1997.

[51] Int. Cl.[7] .............................. H04B 3/58; H04Q 7/20; H04Q 7/32; H04Q 7/36
[52] U.S. Cl. ............................................................ 455/7
[58] Field of Search .................................. 455/555, 7, 419, 455/420; 427/7

[56] References Cited

U.S. PATENT DOCUMENTS

| | | | |
|---|---|---|---|
| 4,790,000 | 12/1988 | Kinoshita | 455/449 |
| 4,833,701 | 5/1989 | Comroe et al. | 455/509 |
| 4,955,050 | 9/1990 | Yamauchi | 455/555 |
| 5,265,150 | 11/1993 | Helmkamp et al. | 455/555 |
| 5,297,192 | 3/1994 | Gerzberg | 455/419 |
| 5,400,327 | 3/1995 | Dezonno | 370/271 |
| 5,442,805 | 8/1995 | Sagers et al. | 455/33.1 |
| 5,504,803 | 4/1996 | Yamada et al. | 379/59 |
| 5,533,027 | 7/1996 | Akerberg et al. | 370/195.1 |
| 5,574,775 | 11/1996 | Miller, II et al. | 379/60 |
| 5,594,777 | 1/1997 | Makkonen | 455/406 |
| 5,606,560 | 2/1997 | Malek et al. | 370/347 |
| 5,625,672 | 4/1997 | Yamada et al. | 379/59 |
| 5,645,949 | 7/1997 | Young | 429/7 |
| 5,734,699 | 3/1998 | Lu et al. | 455/422 |

FOREIGN PATENT DOCUMENTS

WO 94/05101    3/1994    WIPO .

*Primary Examiner*—Thanh Cong Le
*Assistant Examiner*—Alan T. Gantt
*Attorney, Agent, or Firm*—Taylor Russell & Russell P.C.

[57] ABSTRACT

A wireless communication system using radio frequencies for transmitting and receiving voice and data signal with an internal network with multiple internal communication path, and an external communication path for linking the internal network to an external communications network and is suited to operate in remote locations that are isolated. The internal network contains transceivers that allow for decentralized communication along multiple communication paths within the internal network. If the transceivers are within range, they can communicate directly without the need for a central call switching and delivery center. If the transceivers are out of range, they can communicate via intermediate transceivers that relay the calls to the destination transceivers, eliminating the need for a central call switching and delivery center. The internal network has the capability of communicating with an external communications network, such as a public switched telephone network, a satellite communication system, an emergency radio system and a paging system.

50 Claims, 11 Drawing Sheets

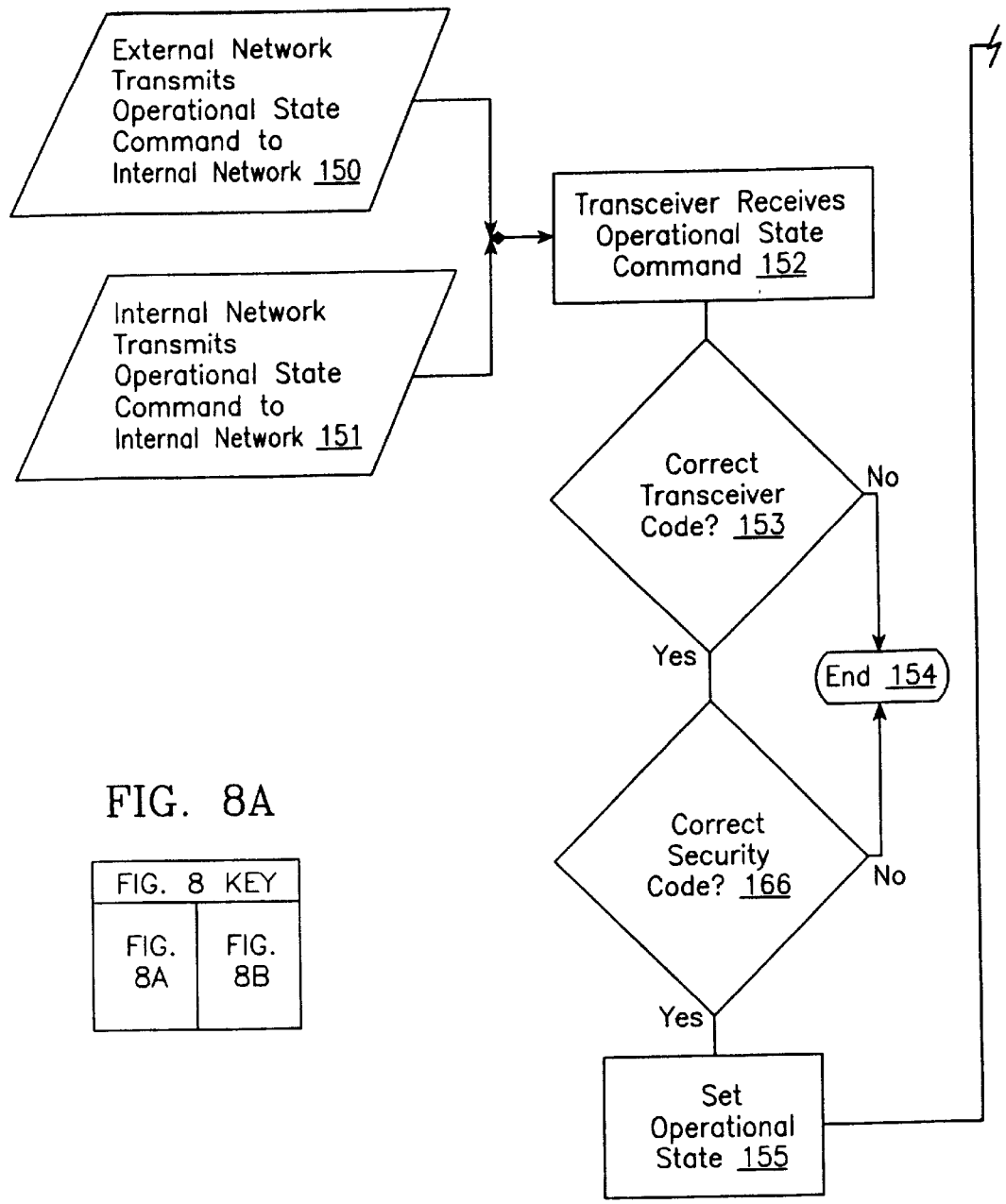
FIG. 8A
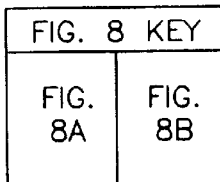

LOCAL WIRELESS COMMUNICATION SYSTEM WITH EXTERNAL COMMUNICATIONS LINK

This application is a continuation-in-part of U.S. patent application Ser. No. 08/979,676, filed Nov. 26, 1997.

BACKGROUND

The invention relates generally to a local wireless communication system and, more particularly, to a wireless communication system using radio frequencies for transmitting and receiving voice and data signal with an internal network with multiple internal communication paths, and an external communication path for linking the internal network to an external communications network.

Wireless communication systems continue to grow, particularly in the areas of cellular and digital telephony and in paging systems. Wireless systems are especially popular in remote areas of the world that have limited wired service because of the cost and difficulty of building a wired infrastructure.

Current traditional wireless communication systems such as cellular telephones, use radio communications between a plurality of subscriber units within the wireless system and between subscriber units and the Public Switch Telephone Network (PSTN) for calls that are outside of the wireless system. Most of these systems are characterized by wireless mobile telephone units communicating with base stations that are connected to centralized mobile switching centers (MSC), that are in turn connected to the PSTN. The centralized MSC performs a number of functions, including routing wireless mobile units calls to other mobile units and wired (land-line) users and routing land-line calls to mobile units. The MSC accomplishes this by being connected to base stations for accessing mobile users and by being connected to the PSTN for accessing users outside the wireless system, be they other wireless users in other wireless systems or land-line users. Therefore the MSC functions, as its name implies, as a switching and routing center that controls the overall operation of the systems. This results in a centralized calling system with the MSC being involved in routing all the calls to and from the wireless system. This centralization allows the MSC to be the primary collection point for compiling billing information for its wireless mobile units. The centralized MSC also creates a need for expensive infrastructure equipment. As more mobile telephone units are added to the system, the MSC must in turn expand to be able to handle the additional volumes of phone calls, connections and the associated billing services. In addition, since the base stations provide the connection to the mobile units, a large increase in the number of mobile units within an area covered by the base station can overload the base station, thus requiring more base stations and/or enhancing the capabilities of the base stations.

Others systems use point-to-point radio communications where mobile units may communicate with other mobile units in the local area. They send origin and destination address information and make use of squelching circuits to direct the wireless transmission to the correct destination address. Most of these systems do not appear to provide a connection to a PSTN to send and receive calls outside the wireless network. This type of system is decentralized, but because of the decentralization, collecting accurate billing information may be a problem.

However, most wireless systems still require a centralized system where a wireless base station (fixed or mobile) operates through a centralized switching center for communication within the wireless network and for communication outside the wireless network, for example to a PSTN. In many cellular and digital wireless systems, base station controllers cover a geographical area and are connected to a mobile services switching center. When a cellular or digital mobile unit places a call, the call is routed to the base station controller serving the mobile unit's geographical area and the base station controller connects the unit to the centralized switching center which in turn routes the call to its appropriate destination. As more wireless units come online in a geographical area, base station controllers and switching centers must be added or upgraded.

Another form of wireless system is called a local multi-point distribution service (LDMS). In an LMDS system, a local area or cell that is approximately 4 km in diameter contains fixed base stations, geographically distributed throughout the local area. One or more antennas within the local area receive calls from the fixed base stations and relay the calls to other fixed base stations. In order for the system to work, the fixed base stations must be within the line-of-sight path of at least one of the antenna units. The LDMS does not provide for mobile stations. Calls can only be routed within the local area and not to an external network. The system is essentially a centralized system within a local area. If one station is not within the line of sight of the antenna, it is effectively cut off from communication.

Therefore there is a need for decentralized wireless communications system for voice and data communication that allows for a flexibility of communication paths, provides local communication as well as optional links to external networks, such as public switch telephone networks, satellites and radio emergency networks, does not require a centralized switching center, provides for secure operation, allows for control the operational state of the internal network, provides for emergency notification and provides a way to collect revenue from the system.

SUMMARY

The present invention is directed to a device and method of use that satisfies these needs. It provides a decentralized wireless communications system for voice and data communication that allows for a flexibility of communication paths, provides local communication as well as optional links to external networks, such as public switch telephone networks, satellites and radio emergency networks, does not require a centralized switching center, provides for secure operation, allows for control the operational state of the internal network, provides for emergency notification and provides a way to collect revenue from the system.

The present invention provides a wireless communication system using radio frequencies for transmitting and receiving voice and data signal with an internal network with multiple internal communication paths, and an external communication path for linking the internal network to an external communications network and is suited to operate in remote locations that are isolated.

The internal network contains transceivers that allow for decentralized communication along multiple communication paths within the internal network. If the transceivers are within range, they can communicate directly without the need for a central call switching and delivery center. If the transceivers are out of range, they can communicate via intermediate transceivers that relay the calls to the destination transceivers. Most transceivers within the internal network have the capability of acting as intermediate transceivers, eliminating the need for a central call switching and delivery center. The internal network has the capability of communicating with an external communications network, such as a PSTN, a satellite communication system, an emergency radio system and a paging system. Each transceiver within the internal network can be equipped to communicate directly with the external communications network, eliminating the need for a central call switching and delivery center. In addition, the transceiver can be set to off, on, standby or emergency state by receiving an operational state command sent by the internal or external network. This provides for secure operation and allows for control of the operational state of the entire internal network of transceivers, a selected group of transceivers or an individual transceiver. Secure operation of each individual transceiver is provided because the transceivers themselves may be battery powered. One of the problems with allowing local wireless internal networks is the inability to continue to collect payments since a decentralized system does not have a centralized collection point for call data. This system solves this problem by allowing the systems to operate only with special batteries. Each battery contains a code that matches the serial number of the transceiver in which it operates. If the battery code does not match the serial number of the transceiver, the transceiver will not operate. The batteries may only be recharged in a special recharge station that allows recharge upon entry of the appropriate serial code. The recharge station may be purchased or rented or an individual may go to a central recharge station and pay for recharge of an individual battery. Payment for the continued operation of the system is collected in this way and solves the problem of collecting payments and call information in a decentralized system. In this way, payment can be made for operation of the individual transceivers. As an additional feature, each transceiver can be set to off by sending an operational state command from the internal or external network. This provides for another way to terminate service if payment for the operation of the transceiver is not made and solves the problem of collecting payments in a decentralized system without a centralized collection point for call data.

The present invention comprises a method of operating a local wireless communication system for transmitting and receiving voice and data signals. An internal network with an internal communication path is established for transmitting and receiving signals within the local wireless communication system, the internal network comprising transceivers, the transceivers comprising mobile stations, fixed base stations and repeaters. An external communication path is established for linking the internal network to an external network for transmitting signals to and receiving signals from the external network.

The external network comprises a PSTN, a satellite, an emergency radio network or a paging system for transmitting paging signals from the external network to the internal network or any combination thereof.

In an alternative embodiment, the operational state of the entire internal network of transceivers may be remotely controlled in response to the receipt of an operational state command. In an alternative embodiment, the operational state command that is received by the internal network is selected from the group of commands consisting of on, off, standby and emergency. In an alternative embodiment, the operational state of a selected group transceivers within the internal network is remotely controlled in response to the receipt of an operational state command. In an alternative embodiment, the operational state of an individual transceiver within the internal network is remotely controlled in response to the receipt of an operational state command. In an alternative embodiment, the operational state of the entire internal network is remotely controlled in response to the receipt of an operational state command, the operational state of a selected group of mobile stations, fixed base stations and repeaters within the internal network is remotely controlled in response to the receipt of an operational state command, and the operational state of an individual mobile station, fixed base station and repeater within the internal network is remotely controlled in response to the receipt of an operational state command.

The operational state command that is received by the internal network may be sent from within the internal network. In an alternative embodiment, the operational state command that is received by the internal network may be sent from the external network.

A method of operating a local wireless communication system, and establishing an internal communication path within the local wireless system comprises transmitting signals directly from an originating mobile station to a destination mobile station and receiving signals directly from the destination mobile station at the originating mobile station. In an alternative embodiment, the establishing an internal communication path within the local wireless system comprises transmitting signals directly from the originating mobile station to a fixed base station and receiving signals from the fixed base station at the originating mobile station. In an alternative embodiment, the establishing an internal communication path within the local wireless system comprises transmitting signals directly from an originating fixed base station to a destination fixed base station and receiving signals from the destination fixed base station at the originating fixed base station. In an alternative embodiment, the establishing an internal communication path within the local wireless system, comprises transmitting signals directly from the originating fixed base station to a repeater and receiving signals from the repeater at the originating fixed base station. In an alternative embodiment, the establishing an internal communication path within the local wireless system comprises transmitting signals directly from the originating mobile station to a repeater and receiving signals from the repeater at the originating mobile station. In an alternative embodiment, the establishing an internal communication path within the local wireless system comprises transmitting signals from a first repeater to a second repeater and receiving signals from the second repeater at the first repeater. In an alternative embodiment, the establishing an internal communication path within the local wireless system comprises transmitting signals from the originating repeater to the originating mobile station and receiving signals from the originating mobile station. In an alternative embodiment, the establishing an internal communication path within the local wireless system comprises transmitting signals from the originating mobile station to the repeater, which in turn transmits signals to a destination mobile station and receiving signals at the originating mobile station from a destination mobile station via the repeater.

In an alternative embodiment, establishing an external communication path further comprises transmitting signals from an originating fixed base station to the external network and receiving signals from the external network at the originating fixed base station. In an alternative embodiment, establishing an external communication path further comprises transmitting signals from an originating mobile station to the external network via a repeater and receiving signals from the external network at the originating mobile station via a repeater. In an alternative embodiment, establishing an internal communication path further comprises transmitting signals from an originating mobile station to the repeater, which in turn transmits signals to a destination mobile station, and receiving signals at the originating mobile station from a destination mobile station via the repeater. In an alternative embodiment, establishing an external communication path further comprises transmitting signals from an originating mobile station to the repeater, which in turn transmits signals to the external network, and receiving signals at the originating mobile station from the external network via the repeater.

In an alternative embodiment, establishing an internal communications path comprises transmitting signals from an originating mobile station to a destination mobile station via an intermediate transceiver in the internal network when the destination mobile station is out of transmission range of the originating mobile station and receiving signals from the destination mobile station at the originating mobile station via the intermediate transceiver; transmitting signals from an originating mobile station to a destination fixed base station via an intermediate transceiver in the internal network when the originating mobile station is out of transmission range of the originating station and receiving signals from the destination fixed base station at the originating mobile station via the intermediate transceiver; and transmitting signals from an originating fixed base station to a destination fixed base station via an intermediate transceiver in the internal network when the originating fixed base station is out of transmission range of the destination fixed base station and receiving signals from the destination fixed base station at the originating fixed base station via the intermediate transceiver.

In an alternative embodiment, establishing an external communications path comprises transmitting signals from an originating mobile station to the external network via an intermediate transceiver in the internal network and receiving signals from the external network at the originating mobile station via the intermediate transceiver, transmitting signals from an originating mobile station to the external network via an intermediate transceiver in the internal network when the originating mobile station and receiving signals from the external network at the originating mobile station via the intermediate transceiver; transmitting signals from an originating fixed base station to the external network via an intermediate transceiver in the internal network and receiving signals from the external network at the originating fixed base station via the intermediate transceiver, and transmitting signals from a repeater to the external communications network via an intermediate transceiver in the internal network and receiving signals from the external communications network at the repeater via the intermediate transceiver.

In an alternative embodiment, the intermediate transceiver is selected from the group consisting of a mobile station, a fixed base station and a repeater.

In an alternative embodiment, establishing of the internal communication path comprises utilizing a first broadcast frequency pair for transmitting and utilizing a second frequency in the broadcast frequency pair for receiving. In an alternative embodiment, establishing of the external communication path further comprises utilizing a first broadcast frequency pair for transmitting and utilizing a second frequency in the broadcast frequency pair for receiving.

In an alternative embodiment, the transmitting from the first repeater to a second repeater further comprises transmitting signals over a land line connection.

In an alternative embodiment, comprising activating the intermediate transceiver in response to a coded signal generated by the originating mobile station, fixed base station and repeater.

In an alternative embodiment, the intermediate transceiver is activated in response to a coded signal generated by the originating mobile station, fixed base station and repeater.

In an alternative embodiment, activating the intermediate transceiver in response to a coded signal further comprises transmitting a coded signal and voice and data transmission from an originating mobile station, fixed base station and repeater, receiving the coded signal and voice and data transmission at the intermediate transceiver whereby the intermediate transceiver rebroadcasts the signal to another mobile station, fixed base station and repeater within the internal network.

In an alternative embodiment, activating the intermediate transceiver in response to a coded signal comprises transmitting a coded signal and voice and data transmission from an originating station, and receiving the coded signal and voice and data transmission at the intermediate transceiver whereby the intermediate transceiver rebroadcasts the signal to the external network.

In an alternative embodiment, the transceivers contain a data processor programmed to operate the transceiver in standby, call initiation, call receive and emergency mode.

In an alternative embodiment, the method of operating the local wireless communication system comprises initializing the originating station in response to an operator entry command, performing a local call initiating procedure if the operator entry command is for transmission within the local wireless network, and performing an external mode call initiating procedure if the operator entry command is for transmission to the external network.

In an alternative embodiment, the performing a local call initiating procedure comprises transmitting a call initiation sequence from the originating transceiver, including the address of the originating transceiver and the address of the destination transceiver, transmitting from the destination transceiver a call return sequence in response to the call initiation sequence, and transmitting from the originating transceiver a call lock sequence in response to the call return sequence and establishing voice or data communication between the originating transceiver and the destination transceiver within the internal network.

In an alternative embodiment, the intermediate transceiver is activated in response to a coded signal the coded signal comprising a boost code sent by a user of the originating mobile station, fixed base station and repeater.

In an alternative embodiment, the intermediate transceiver is activated in response to a coded signal, the coded signal comprising a boost code sent by a user of the originating mobile station, fixed base station and repeater.

In an alternative embodiment, the operational state of the transceiver is controlled by supplying power to the transceiver using a battery power supply, encoding a serial number in a microprocessor embedded in the battery power supply, performing a check by a microprocessor-based program residing in the transceiver of the serial number of the battery with a transceiver serial number embedded in the transceiver, and allowing the mobile station, fixed base station and repeater to operate if the serial number in the battery matches the transceiver serial number.

In an alternative embodiment, the serial number encoded in the battery pack is reprogrammed to match the transceiver serial number.

In an alternative embodiment, the operational state of the transceiver is controlled by checking a preprogrammed clock embedded within a microprocessor-based program residing in the transceiver, and the transceiver is allowed to operate if the preprogrammed clock has not timed out.

In an alternative embodiment, the preprogrammed clock of the transceiver is changed upon receipt of a coded signal and clock update command in an operational state command received from within the internal network. In an alternative embodiment, the preprogrammed clock of the transceiver is changed upon receipt of a coded signal and clock update command in an operational state command received from the external network.

In an alternative embodiment, the local wireless communication system comprises a wireless internal network with an internal communication path for transmitting and receiving signals within the local wireless communication system, the internal network comprises transceivers. The transceivers comprise mobile stations, fixed base stations and repeaters, means for controlling the operational state of the transceiver by supplying power to the transceiver using a battery power supply; means for encoding a serial number in a microprocessor embedded in the battery power supply, means for performing a check by a microprocessor-based program residing in the transceiver, of the serial number of the battery with a transceiver serial number embedded in the transceiver, and means for allowing the transceiver to operate if the serial number in the battery matches the transceiver serial number.

In an alternative embodiment, the local wireless communication system comprises a means for recharging the battery power supply. The means for recharging contains a selected transceiver serial number stored in memory. The means for recharging contains a microprocessor based program that checks the selected transceiver number with the serial number in the battery power supply and allows the battery to be recharged only if the numbers match.

In an alternative embodiment, the local wireless communication system comprises a means for reprogramming the serial number encoded in the battery pack to match the transceiver serial number.

In an alternative embodiment, the means for reprogramming the serial number contains a means for recharging the battery power supply when the serial number in the microprocessor embedded in the battery power supply matches the serial number embedded in the transceiver.

In an alternative embodiment, the local wireless communication system comprises a wireless internal network with an internal communication path for transmitting and receiving signals within the local wireless communication system, the internal network comprising transceivers. The transceivers comprise mobile stations, fixed base stations and repeaters, means for controlling the operational state of the transceiver by checking a preprogrammed clock embedded within a microprocessor-based program residing in the transceiver, and means for allowing the transceiver to operate if the clock has not timed out.

In an alternative embodiment, the local wireless communication system comprises means for remotely changing the preprogrammed clock of the transceiver upon receipt of a coded signal and clock update command in an operational state command received from within the internal network.

In an alternative embodiment, the local wireless communication system, comprises an external communication path for linking the internal network to an external network for transmitting signals to and receiving signals from the external network and means for remotely changing the preprogrammed clock of the transceiver upon receipt of a coded signal and clock update command in an operational state command received from the external network.

BRIEF DESCRIPTION OF THE DRAWINGS

These and other features, aspects, and advantages of the present invention will become better understood with regard to the following description, appended claims, and accompanying drawings where:

FIGS. 8A and 8B show a flowchart of the method of operation of receiving an operational state command call at a transceiver of the internal network in accordance with the present inventive concept.

DETAILED DESCRIPTION

Figure 1:
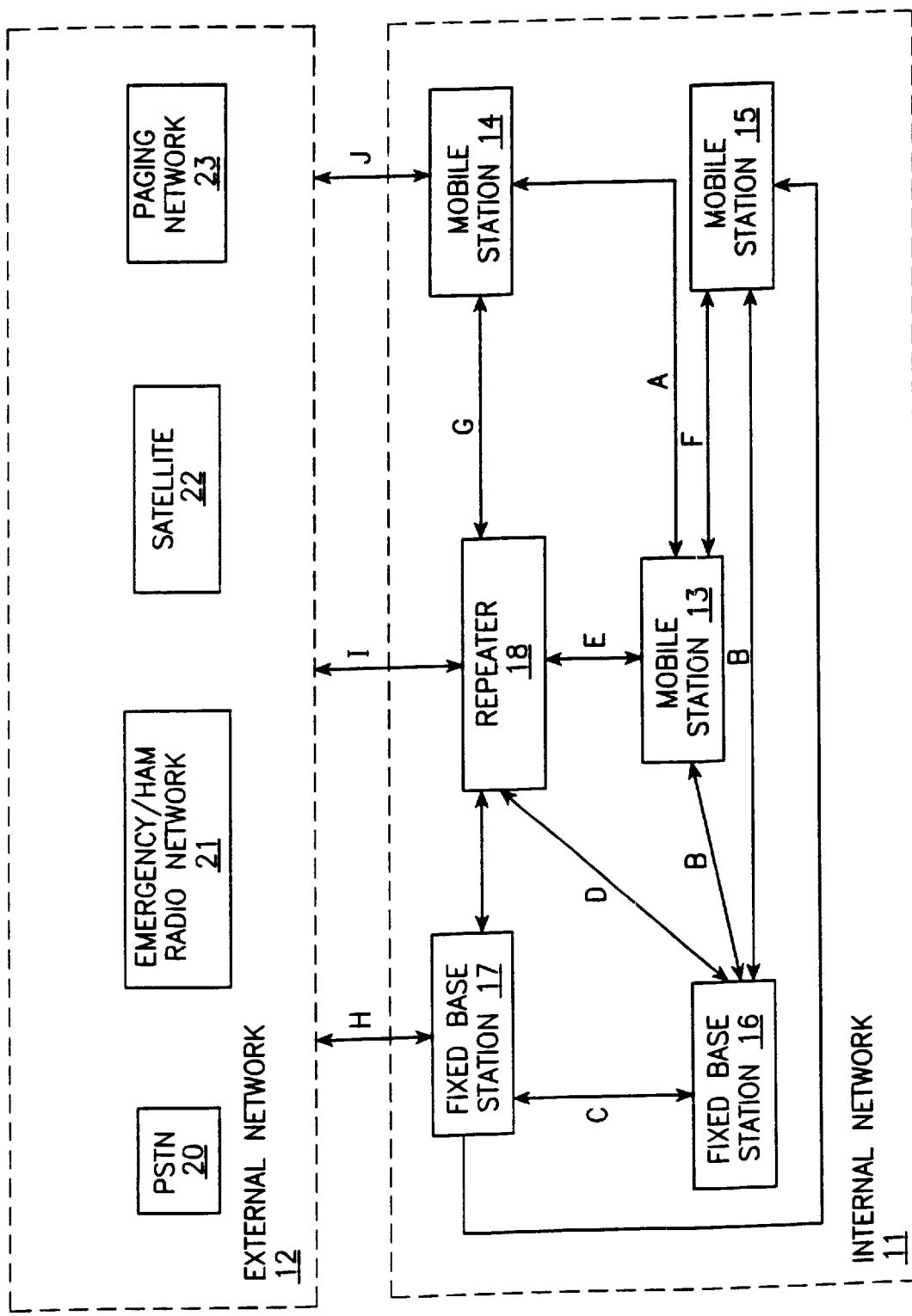
FIG. 1 shows the local wireless communication system with an internal network and external network in accordance with the present inventive concept.

Turning now to FIG. 1, a preferred embodiment of the local wireless communication system 10 is shown in accordance with the present inventive concepts.

The local wireless communication system 10 includes an internal network 11 and an external network 12. The internal network 11 contains a plurality of transceivers, mobile stations 13, 14 and 15, fixed base stations 16 and 17, and a repeater 18. The system may also include more than one repeater 18. The internal communication paths for transmitting wireless voice and date signals are shown as paths A, B, C, D, E, F and G. Signals may be transmitted and received along internal communication path A between mobile stations 13 and 14. Signals may be transmitted and received along internal communication path B between mobile unit 13 to fixed base station 16. Signals may be transmitted and received along internal communication path C between fixed base stations 16 and 17. Signals may be transmitted and received along internal communication path D between fixed base station 16 and repeater 18. Signals may be transmitted and received along internal communication path E between mobile station 13 to repeater 18. Signals may be transmitted and received along internal communication path F between mobile stations 13 and 15. Signals may be transmitted and received along internal communication path G between repeater 18 and mobile station 14. The internal communication paths can be selected dynamically according to the position and range of the transceivers within the internal network. For example, if communication is desired between mobile station 13 and mobile station 14 and the stations are out of direct transmission range, mobile station 13 can communicate along path E to repeater 18 which acts as an intermediate transceiver and in turn sends the communication along path G to mobile station 14. Similarly, if communication is desired between mobile station 13 and fixed based station 16 and the stations are out of direct transmission range, mobile station 13 can communicate along path E to repeater 18 which in turn sends the communication to fixed base station 16 along path D. If communication is desired between mobile station 15 and mobile station 14 and the stations are out of direct transmission range, mobile station 15 can communicate along path F to mobile station 13, which in turn sends the communication to mobile station 14. In this example, mobile station 13 is used as the intermediate transceiver either automatically by the system or in response to a boost code initiated by the operator and shown in FIG. 6A. The external communication paths for transmitting wireless voice and date signals between the internal network 11 and the external network 12 are shown as paths, H I and J. The external network 12 can be a Public Switched Telephone Network (PSTN) 20, a radio network 21, a satellite system 22 and a paging network 23 or any combination thereof. Communication is along external communication path H when signals are transmitted from and received by fixed base station 17. Communication is along external communication path I when signals are transmitted from and received by repeater 18. Communication is along external communication path J when signals are transmitted from and received by mobile station 14. For example, if a signal is sent from the external communications network 12, from a PSTN phone, to fixed base unit 16 in the internal communications network 11, it can be received along path H if the fixed base station 16 has a wired connection to PSTN or it can be received along paths I and D via the repeater 18 acting as an intermediate transceiver if the fixed base station 16 does not have a wired connection to the PSTN. Communication from a mobile station 13 to the external network 12 can occur through the repeater along paths E and I.

Figure 2:
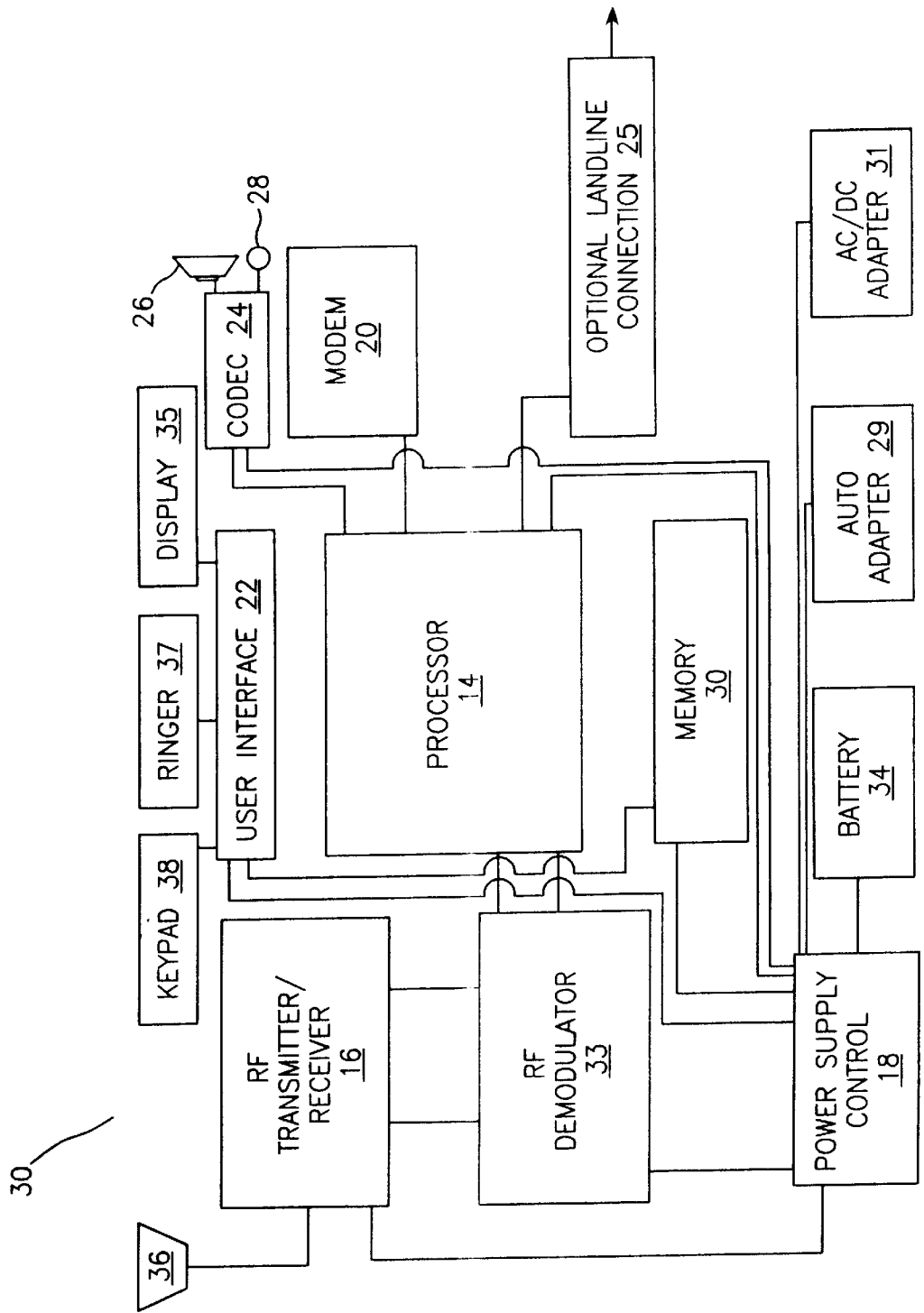
FIG. 2 shows a block diagram of a transceiver in accordance with the present inventive concept.

Turning now to FIG. 2, a block diagram of a transceiver of the present invention is shown in accordance with the present inventive concepts. The transceiver may be a fixed base station or mobile station. The transceiver 30 includes, a user interface 22, a processor 14, an RF Transmission/Receiving unit 16, an RF Modulator 33, a power supply control 18, a modem 20, memory 30, speaker 26, a microphone 28, battery 34, vehicle power adapter 29, AC/DC power converter adapter 31 and an optional land line connection 25. The user interface 12 allows the user to interact with the transceiver 30. The user interface 12 includes a display 35, a keypad 38, and a ringer 37. Voice signals are sent and received via codec 24 through speaker 26 and microphone 28. User generated data, status and prompting information generated by the fixed base unit 20 is presented to the user via a display 35. The display 35 may also provide dedicated indicators to show status information, including low battery, incoming call, and signal strength. The transceiver 30 also includes a keypad 38, providing the user an interface for selecting and initiating unit-to-unit communication, selecting user functions and features, and initiating user programmable features. The keypad 38 may include a set of standard buttons that are required to dial a telephone number and a set of dedicated buttons for special functions. Data entered at the keypad 38 is provided to the processor 14, where the data is processed. External memory 30 may be connected to the processor 14 for storing program code in ROM or data in RAM. Alternatively, the processor 14 may include its own RAM or ROM. The processor 14 performs all the switching capabilities to determine whether a call should be sent to the internal network or external network. If the call is to be sent to the internal network via RF communications, the processor 14 formats the data and instructs the data to be transmitted through the RF Transmission/Receiving unit 16 to the antenna and then to the internal network. If the call is to be sent to the external network, the processor 14 formats the data and instructs the data to be transmitted through the RF Transmission/Receiving unit 16 to the antenna and then to the external network.

Voice communications performed via the wireless system require processing of input/output analog signals since the microphone 28 and the speaker 26 are analog devices. The voice signals produced by the microphone 28 are converted to digital representations by codec 24. After conversion, the digital signal may be encoded or encrypted prior to RF transmission to provide security of the communications or to minimize (or compress) the amount of digital information prior to RF transmission. For example, the voice data may be encoded using any known available algorithm for coding voice data including, for example, Code-Excited Linear Predictive Coding (CELP).

The RF Transmission/Receiving unit 16 transmits a radio frequency signal representing the data to be transmitted. The codec 24 provides the processor 14 with digitized voice data, which is then presented to the RF Modulator 33 for digitally modulating the RF carrier for broadcast through the RF Transmission/Receiving unit 16 and the antenna 36. Received-call voice data, received over the antenna 36 and by the RF Transmission/Receiving unit 16, is demodulated from the RF carrier within the RF Modulator 33 and presented to the processor 14 in digital form for routing to the codec 24. The codec 24 converts the digital voice data into analog signals for the speaker 26 transducers to convert to sound waves enabling the user to hear the transmitted voice through the speaker 26. The processor 14 encrypts or compresses any digital signals being transmitted prior to these signals being presented to the RF Modulator 33. Upon receiving call data, the processor 14 decrypts or decompresses any digital signals received from the RF Modulator 33 prior to presentation to the codec 24.

Digital data from a facsimile or computer modem source which has been transmitted to a fixed base unit is recognized by the transmission of digital data signal protocols sent at the beginning of any facsimile or computer modem transmission. The processor 14 reads these coded instructions and routs the digital data to the modem 20 for output to an attached facsimile or computer. This routing avoids converting these digital signals to analog by the codec 24. In operation, the RF Transmission/Receiving unit 16 may be capable of transmitting and receiving data at a variety of frequencies through antenna 36. For example, the RF Transmission/Receiver unit 16 may be configured to operate in the traditional cellular frequency of 800 MHz. In another embodiment of the invention, the RF Transmission/Receiver unit 16 permits the fixed base unit 4 to operate in the PCS frequency of 1.9 ghz. Other frequencies are also acceptable. It is presently contemplated that frequencies within the range of 50 MHz to 5 Ghz may be used, and preferably 400–450 MHz. Further, the processor 14 may also configure the voice data or facsimile/computer digital data for communication over the optional land line connection 25. Therefore, the processor 14 must be capable of providing the switching capabilities traditionally found in base station equipment in cellular telephone systems. The land line connection 25 allows the user to initiate, establish, and terminate outgoing calls as well as receive, respond to, and terminate incoming calls from the land line connection 25. The present invention may interface to the land line via any standard telephone adapter.

Figure 3:
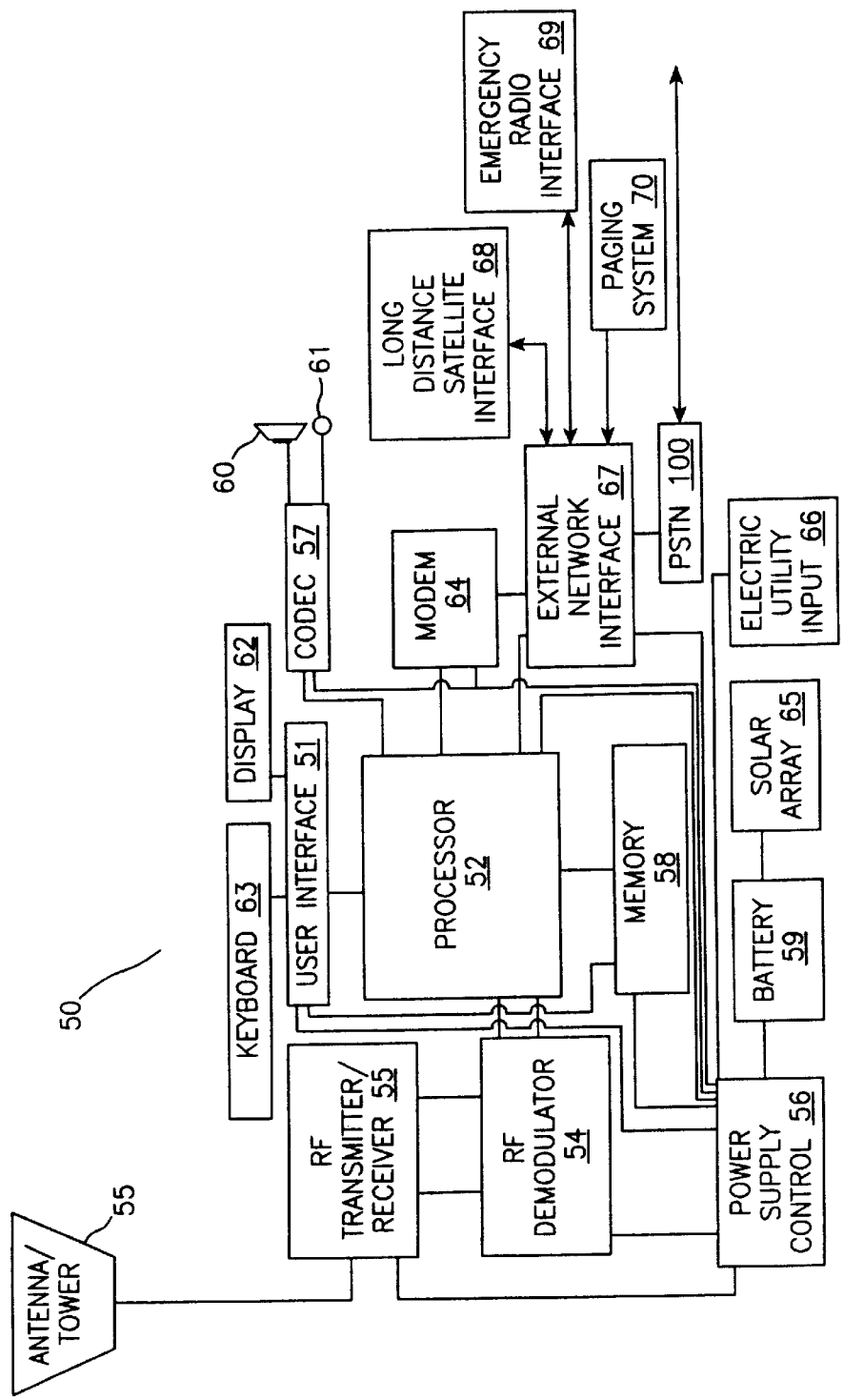
FIG. 3 shows a block diagram of a repeater in accordance with the present inventive concept.

Turning now to FIG. 3, a block diagram of a repeater transceiver is shown in accordance with the present inventive concepts. The repeater 50 includes: a user interface 51, a processor 52, an RF Transmission/Receiving unit 53, an RF Modulator 54, an antenna 55, a power supply control 56, a codec 57, a memory 58, an optional battery 59, a speaker 60, and a microphone 61. The user interface 51 allows the user to interact with the repeater 50. The user interface 51 includes a display 62, a keyboard 63. Voice signals are sent and received via codec 57 through speaker 60 and microphone 61. User generated data, status and prompting information generated by the repeater 50 is presented to the user via a display 62. The display 62 may also provide dedicated indicators to show status information, including low battery, incoming call, and signal strength. The keyboard 63 provides the user interface for selecting and initiating unit-to-unit communication, selecting user functions and features, and initiating user programmable features. Data entered at the keyboard 63 is provided to the processor 52, where the data is processed. External memory 58 may be connected to the processor 52 for storing program code in ROM or data in RAM. Alternatively, the processor 52 may include its own RAM or ROM. The processor 52 performs all the switching capabilities required to send a call via RF communications. The call, sent via RF communications, is processed in the processor 52 which formats the data and instructs the data to be sent to the RF Modulator 54. The RF Modulator 54 then transmits the modulated carrier through the RF Transmission/Receiving unit 53 and over the mobile unit's antenna 55. If the call is to be sent to the internal network via RF communications, the processor 52 formats the data and instructs the data to be transmitted through the RF Transmission/Receiving unit 53 to the antenna 55 and then to the internal network. If the call is to be sent to the external network, the processor 52 formats the data and instructs the data to be transmitted through the RF Transmission/Receiving unit 53 to the antenna 55 and then to the external network.

Voice communications requires processing of input/output analog signals since the microphone 60 and the speaker 61 are analog devices. The voice signals produced by the microphone 60 are converted to digital representations by codec 57. After conversion, the digital signal may be encoded or encrypted prior to RF transmission to provide security of the communications or to minimize (or compress) the amount of digital information prior to RF transmission. For example, the voice data may be encoded using any known available algorithm for coding voice data including, for example, Code-Excited Linear Predictive Coding (CELP).

The RF Transmission/Receiving unit 53 transmits a radio frequency signal representing the data to be transmitted. The codec 57 provides the processor 52 with digitized voice data, which is then presented to the RF Modulator 54 for digitally modulating the RF carrier for broadcast through the RF Transmission/Receiving unit 53 and the antenna 55. Call voice data, received over the antenna 55 and by the RF Transmission/Receiving unit 53, is demodulated from the RF carrier within the RF Modulator 54 and presented to the processor 52 in digital form for routing to the codec 57. The codec 57 converts the digital voice data into analog signals for the speaker 60 transducers. The processor 52 encrypts or compresses any digital signals being transmitted prior to these signals being presented to the RF Modulator 54 for eventual broadcast. Upon receiving call data, the processor 52 decrypts or decompresses any digital signals received from the RF Modulator prior to presentation to the codec 57.

In operation, the RF Transmission/Receiving unit 53 may be capable of transmitting and receiving data at a variety of frequencies through antenna 55. For example, the RF Transmission/Receiver unit 53 may be configured to operate in the traditional cellular frequency of 800 MHz. In another embodiment of the invention, the RF Transmission/Receiver unit 536 permits the mobile unit to operate in the PCS frequency of 1.9 Ghz. Once again, other frequencies would also be acceptable, and it is presently contemplated that frequencies within the range of 50 MHz to 5 Ghz may be used, and preferably 400–450 MHz.

A modem 64 also provides a data communications link to the external network for data transfer using any readily available and accepted modulation technique such as, for example, Frequency Shift Keying (FSK). It should be understood, however, that other modulation techniques may be used without departing from the spirit and scope of the present invention. For example, the modem 64 may use Frequency Modulation (FM), Phase Shift Keying (FSK), Quadrature Amplitude Modulation (QAM), or other modulation techniques known to the art.

The processor 52 has a connection to the external network interface 67. The external network interface 67 has the capability of interfacing with a long distance satellite interface 68, an emergency radio interface 69, a paging system 70 or a PSTN 100. The repeater 50 can contain all of these external network interfaces or any combination of interfaces. The external network interface 67 is tailored to the specific external network and contains the necessary hardware and software to communicate with the specific interface.

The repeater 50 includes a power supply control 56. Power is supplied to the components by one of the following: an internal battery 59 which has an optional recharge by a solar array 65, or an electric utility connection 66.

Figure 4:
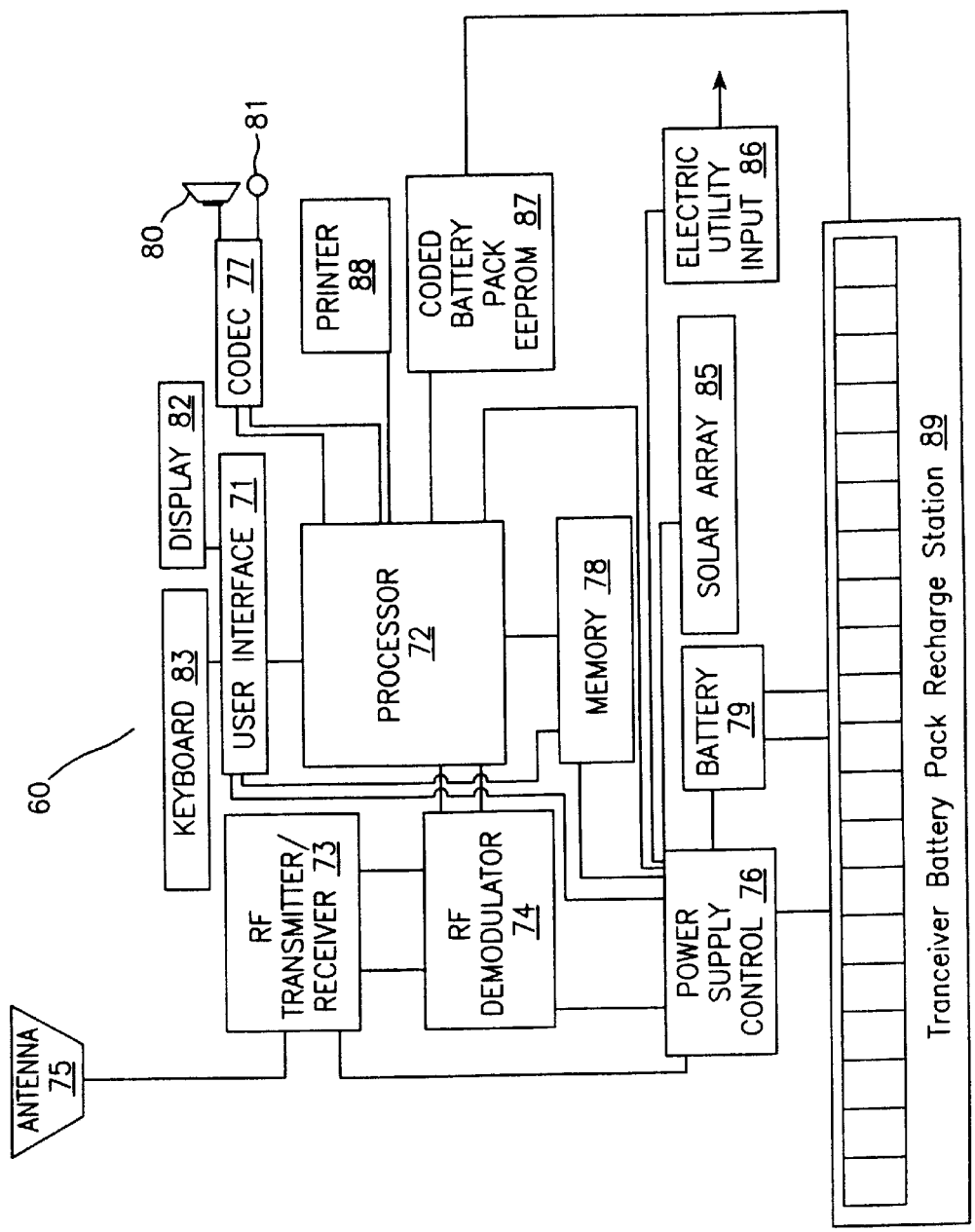
FIG. 4 shows a block diagram of a battery pack recharge station in accordance with the present inventive concept.

Turning now to FIG. 4, a block diagram of battery pack recharge station is shown in accordance with the present inventive concepts. The recharge station 60 which is used to recharge battery packs for the transceivers 40 and repeater 50 includes: a user interface 71, a processor 72, an RF Transmitter/Receiver 73, an RF Modulator 74, an antenna 75, a power supply control 76, a codec 77, a memory 78, an optional battery 79, optional solar connection 85, an optional electric utility connection 86, a speaker 80, a microphone 81, an EEPROM for storing battery pack codes 87 and an optional printer 88. The user interface 71 allows the user to interact with the recharge station 60 and includes a display 82, a keyboard 83. There is also a printer 88 for printing system status, operator input data and system status. Voice signals are sent and received via codec 77 through speaker 80 and microphone 81. User generated data, status and prompting information generated by the battery recharge station 60 is presented to the user via a display 82. The display 82 may also provide dedicated indicators to show status information, including low battery, incoming call, and signal strength. The keyboard 83 provides the user interface for selecting and initiating battery recharge, selecting user functions and features, and initiating user programmable features. Data entered at the keyboard 63 is provided to the processor 72. External memory 78 may be connected to the processor 72 for storing program code in ROM or data in RAM. Alternatively, the processor 72 may include its own RAM or ROM. The recharge station can be activated or deactivated upon receiving an incoming message from the antenna 75 through the RF transmitter/receiver 73 and RF Modulator 74. The processor 72 decodes the message and sets the recharger station 60 to on or off. The recharger station has the optional capability to functions as a transceiver for sending calls via RF communications. The call, sent via RF communications, is processed in the processor 72 which formats the data and instructs the data to be sent to the RF Modulator 74. The RF Modulator 74 then transmits the modulated carrier through the RF Transmission/Receiving unit 73 and over the mobile unit's antenna 75. If the call is to be sent to the internal network via RF communications, the processor 72 formats the data and instructs the data to be transmitted through the RF Transmission/Receiving unit 73 to the antenna 75 and then to the internal network. If the call is to be sent to the external network, the processor 72 formats the data and instructs the data to be transmitted through the RF Transmission/Receiving unit 73 to the antenna 75 and then to the external network. When the recharge station 60 functions as a transceiver for receiving and sending calls, voice communications requires processing of input/output analog signals since the microphone 80 and the speaker 81 are analog devices. The voice signals produced by the microphone 80 are converted to digital representations by codec 77. When a battery is to be recharged at the recharge station 60, it is inserted in one of a plurality of battery recharge slots 89. The operator using the user interface 71 enters the coded number corresponding to a transceiver's serial number is entered. The serial number is stored in the EEPROM of the coded battery pack 87. The transceiver will not operate if the serial number of the transceiver does not match the serial number stored in the EEPROM of the battery pack 87.

Figure 5:
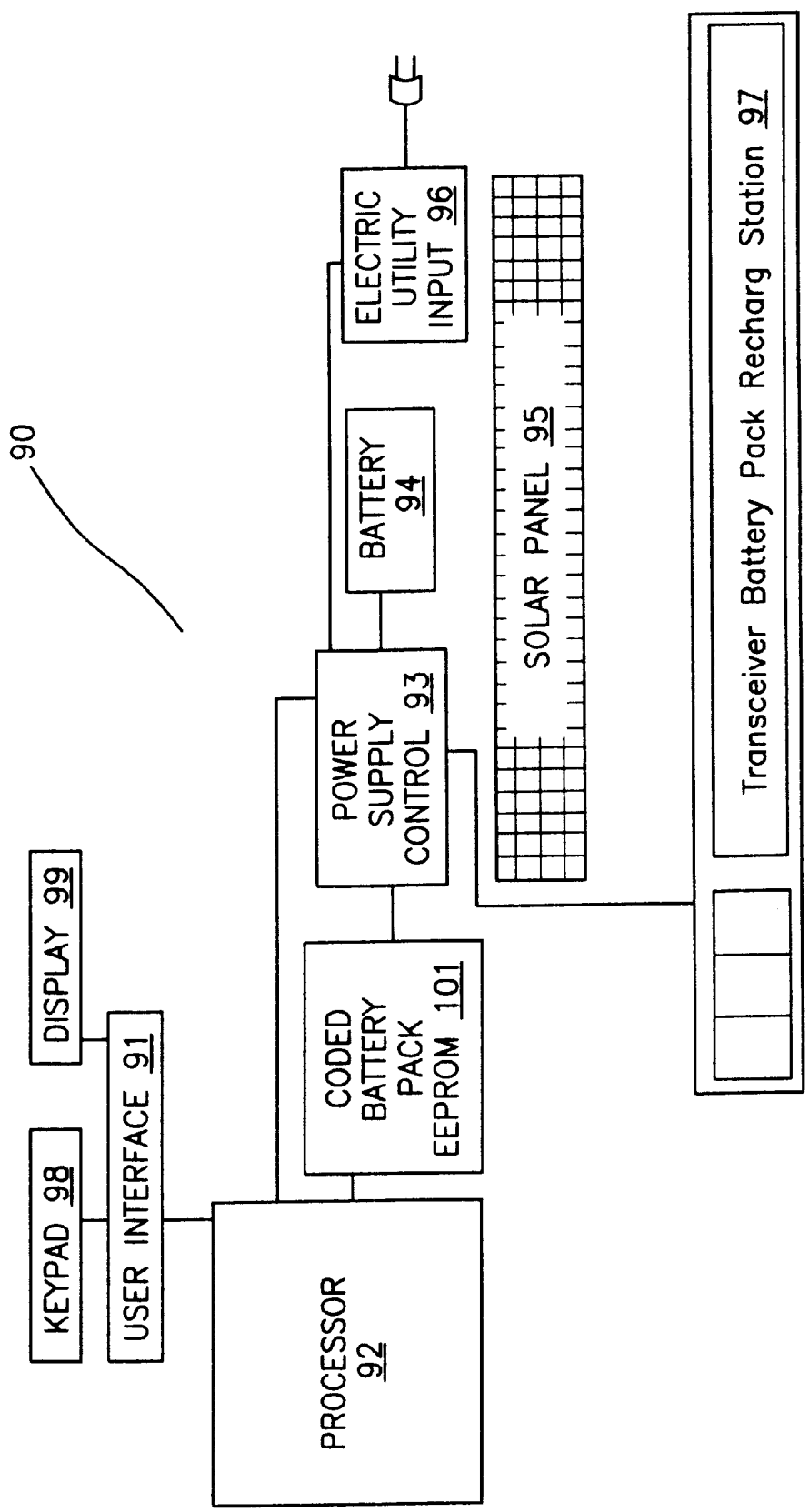
FIG. 5 shows a block diagram of an alternative embodiment of a battery pack recharge station in accordance with the present inventive concept.

Turning now to FIG. 5, an a block diagram of an alternate embodiment of a battery pack recharge station is shown in accordance with the present inventive concepts. The recharge station 90 which is used to recharge battery packs for the transceivers 40 and repeater 50 includes: a user interface 91, a processor 92, a power supply control 93, an optional battery 94, optional solar connection 95, an optional electric utility connection 96, and a plurality of battery recharge slots 97. The user interface 91 allows the user to interact with the recharge station 90 and includes a display 99 and a keypad 98. User generated data, status and prompting information generated by the battery recharge station 90 is presented to the user via a display 99. The keypad 98 provides the user interface for selecting and initiating battery recharge, selecting user functions and features, and initiating user programmable features. Data entered at the keypad 98 is provided to the processor 92. When a battery is to be recharged at the recharge station 90, it is inserted into one of a plurality of battery recharge slots 97. The operator, using the user interface 91 enters a coded number corresponding to the serial number of the transceiver in which the battery is to be loaded. The serial number is then stored in the EEPROM of the coded battery pack 101. The transceiver will not operate if the serial number of the transceiver does not match the serial number stored in the EEPROM of the battery coded pack 101. Alternatively, the processor 92 can be programmed to recognize the serial numbers for a specific transceiver or plurality of transceivers. In this case, when a battery is to be recharged at the recharge station 90, it is inserted into one of the plurality of battery recharge slots 97. The operator, using the user interface 91, initiates recharge. The program operating in the processor 92 checks the battery serial pack number stored in the EEPROM 101 located on the battery pack in the recharge slot 97, and if the serial number matches one of the stored serial numbers, recharge occurs. If the serial number of the battery in the recharge slot 97 does not match one of the stored serial numbers, charging is not initiated by the processor 92.

Figure 6A:
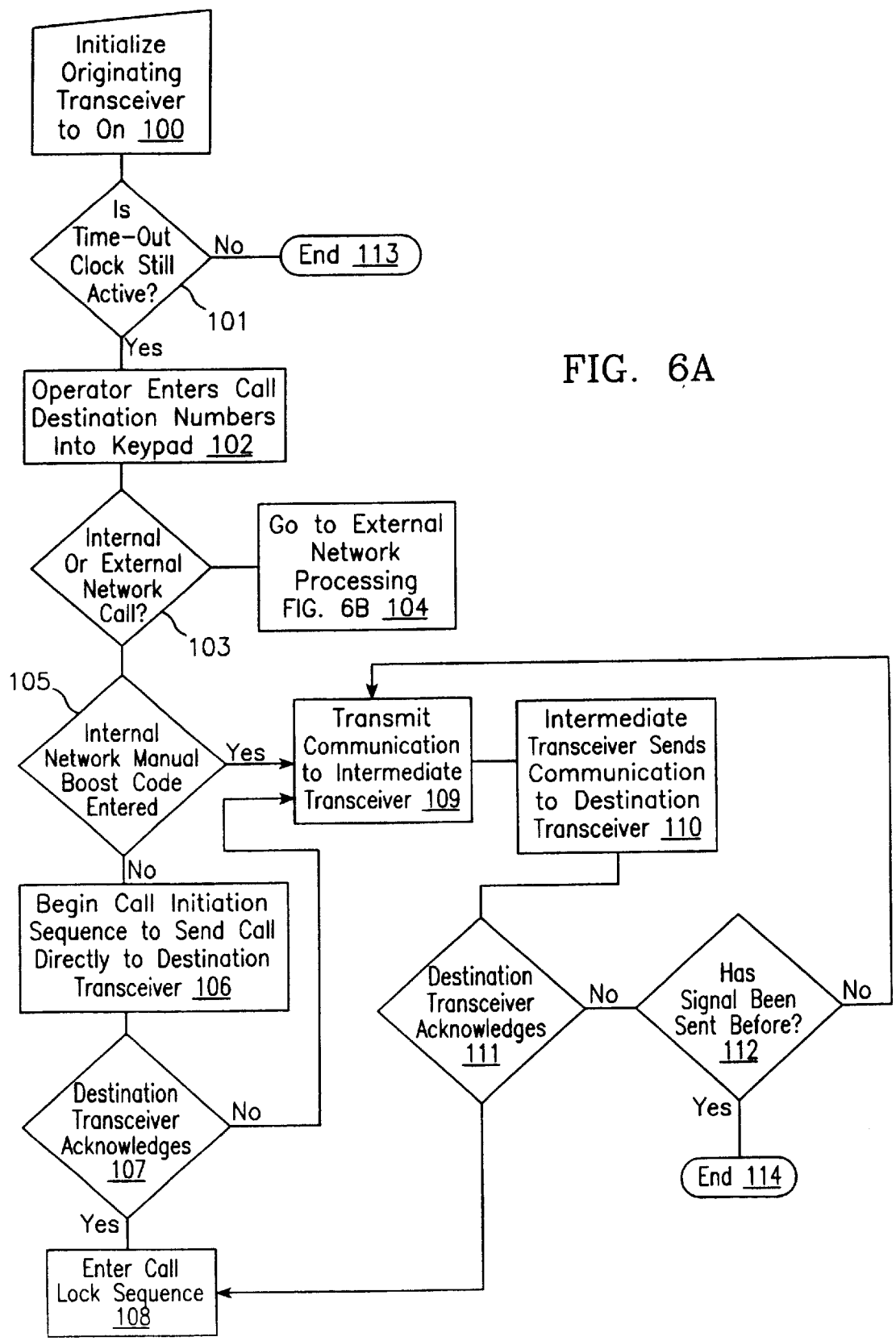
FIG. 6A shows a flowchart of the method of operation of initiating a call at a transceiver of the internal network in accordance with the present inventive concept.

Turning now to FIG. 6A, a flowchart of the method of operation of initiating a call at a transceiver of the internal network is shown in accordance with the present inventive concept. The transceiver may be a mobile station, fixed base station, repeater or battery recharge station that has transmit functionality. Referring to FIG. 6A, the user initializes the transceiver to on 100. If the time-out clock which is accessed by the processor in the transceiver, is not active 101, processing ends 113. Otherwise, if the time-out clock is still active, the operator is allowed to enter the call destination numbers into the keypad of the transceiver 102. By analyzing the call destination number, the processor can identify that the call is for the internal or external communications network 103. If the call is for the external communications network, processing continues 104 in FIG. 6B. If the call is for the internal communications network, the transceiver checks to see if a manual boost code was entered by the operator 105. If the boost code was not entered, a call initiation sequence sends the call directly to the destination transceiver 106. If the destination transceiver acknowledges the call 107, a call lock sequence is entered where signals are transmitted and received between the originating and destination transceivers 108. If the destination transceiver does not acknowledge 107 or if the manual boost code was entered 105, the originating unit transmits the communication to the intermediate transceiver 109. The intermediate transceiver (which can be a mobile station, fixed base station or repeater), sends the communication to the destination transceiver 110. If the destination transceiver acknowledges 111, a call lock sequence is entered where signals are transmitted and received between the originating and destination transceivers 108. If the destination transceiver does not acknowledge 111 and the signal has been sent at least twice 112, processing ends 114. If the destination transceiver does not acknowledge 111 and the signal has not been sent at least twice 112, processing continues at step 109.

Figure 6B:
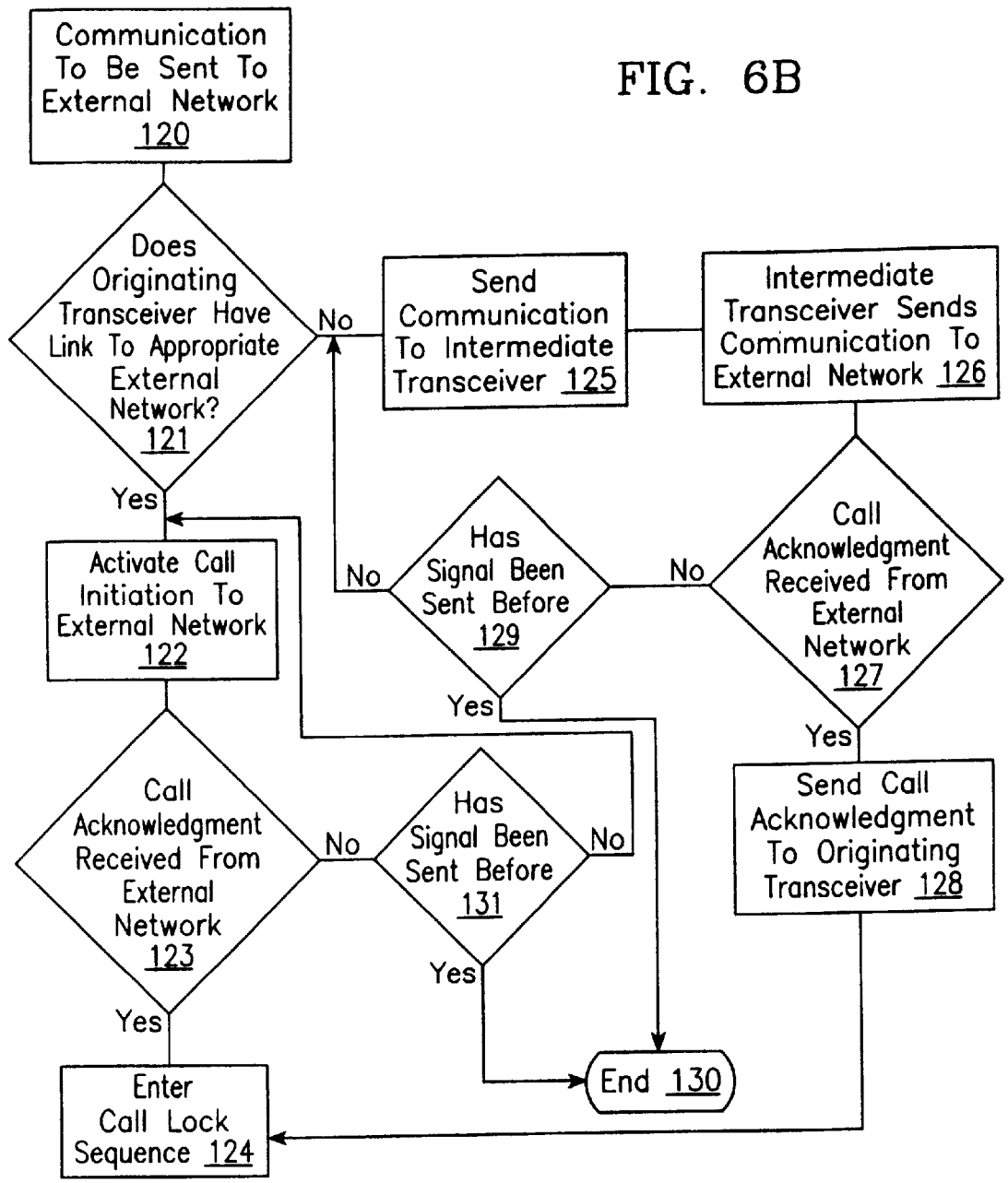
FIG. 6B shows a flowchart of the method of operation of sending a call to the external network in accordance with the present inventive concept.

Turning now to FIG. 6B, a flowchart of the method of operation of sending a call to the external network is shown in accordance with the present inventive concept. If the call is to be sent to the external network 120 and the originating transceiver has a link to the appropriate external network 121, call initiation is activated 122. If a call acknowledge is received from the external network 123, a call lock sequence is entered where signals are transmitted and received between the originating and destination transceivers 124. If a call acknowledge has not been received from the external network 124 and the signal has not been sent at least twice 131, processing continues at step 122. If the signal has been sent at least twice 131, processing ends 132. If the originating transceiver does not have a link to the appropriate external network 121, the communication is sent to an intermediate transceiver 125 and the intermediate transceiver sends the communication to the external network 126. If a call acknowledge is received from the external network 127, a call acknowledge is sent to the originating transceiver 128 and a call lock sequence is entered 124 where signals are transmitted and received between the originating and destination transceivers via the intermediate transceiver. If the call acknowledge is not received from the external network 127, and the signal had been not been sent at least twice 129, processing continues at step 125. If the signal has been sent at least twice 129, processing ends.

Figure 7:
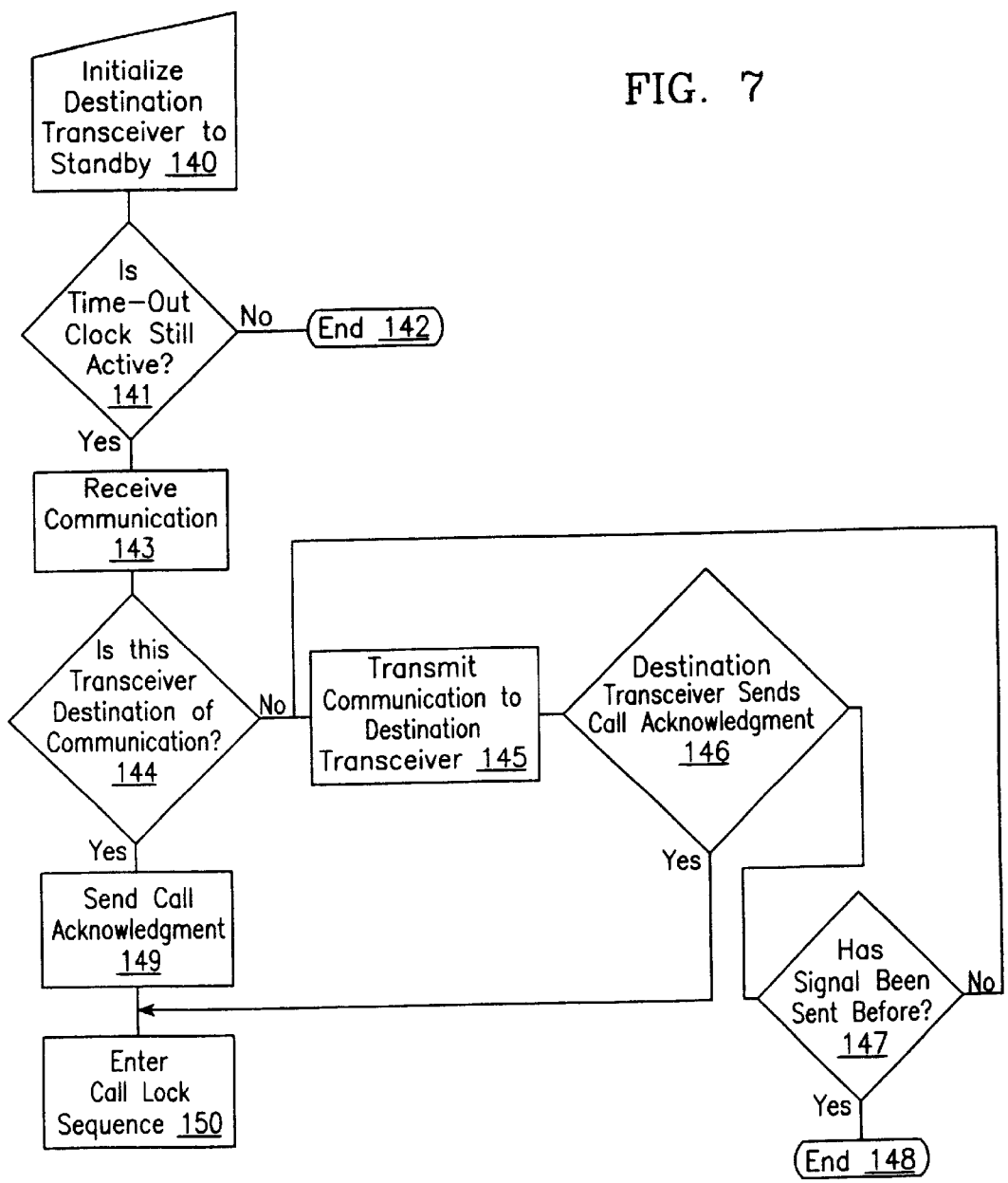
FIG. 7 shows a flowchart of the method of operation of receiving a call at a transceiver of the internal network in accordance with the present inventive concept.

Turning now to FIG. 7, a flowchart of the method of operation of receiving a call at a transceiver of the internal network is shown in accordance with the present inventive concept. The destination transceiver must be initialized to standby 140. If the time-out clock is not active 141, processing ends 142. If the time-out clock is still active 141, indicating the transceiver is available to send and receive communication, the transceiver receives the communication 143. If this transceiver is the destination transceiver for the communication 144, a call acknowledgment is sent by this destination transceiver to the call originator either in the internal or external network 149. and a call lock sequence is entered 150 where signals are transmitted and received between the call originator and the destination transceiver. If this transceiver is not the destination transceiver 144, this transceiver is the intermediate transceiver and transmits the communication to the destination transceiver 145. If the destination transceiver sends a call acknowledgment to the intermediate transceiver 146, a call lock sequence is entered 150 where signals are transmitted and received between the call originator and the destination transceivers via the intermediate transceiver. If the destination transceiver does not send a call acknowledgment 146, and the signal has not been sent at least twice 147, processing continues at step 145. If the signal has been sent at least twice 147, processing ends 148.

Figure 8B:
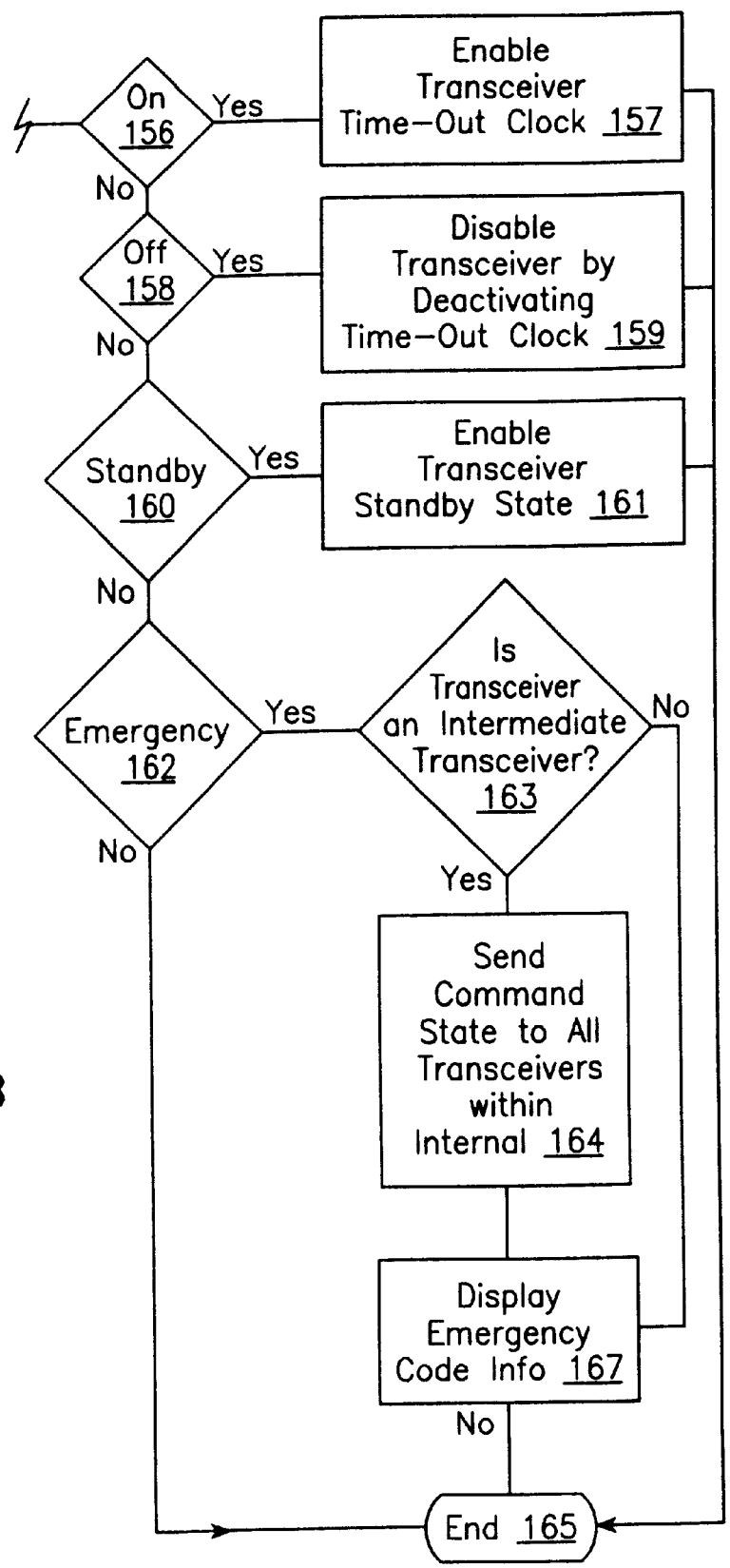

Turning now to FIGS. 8A and 8B a flowchart of the method of operation of receiving an operational state command call at a transceiver of the internal network is shown in accordance with the present inventive concept. The external network transmits an operational state command to the internal network 150 or the internal network transmits and operational state command to the internal network 151. A transceiver within the internal network receives an operational state command 152. The transceiver checks that the transceiver code matches and if it is not, processing ends 154. If it is correct, the transceiver's processor checks the security code sent with the operational state command 153. If the security code does not match the security code stored in memory 153, processing ends 154. If the security code matches the security code stored in memory 153, the transceiver's processor sets the operational state of the transceiver 155 to the state specified in the operational state command. If the state is ON 156, the transceiver is enabled and the time-out clock is activated 157. If the state is OFF 158, the transceiver is disabled by deactivating the time-out clock 159. If the state is STANDBY 160, the transceiver is activated to standby 161. If the state is EMERGENCY 162, the processor in the transceiver checks to determine if this transceiver is an intermediate transceiver 163. If this transceiver is not an intermediate transceiver, but is the destination transceiver 163, the transceiver displays an emergency code and message on the display of the transceiver 166. If this transceiver is an intermediate transceiver 163, this transceiver sends the emergency operational state command to all transceivers within the internal network 164 and processing continues at step 166. If the operational state command 155 is neither ON 156, OFF 158, STANDBY 160 or EMERGENCY 162, processing ends 165.

Figure 9:
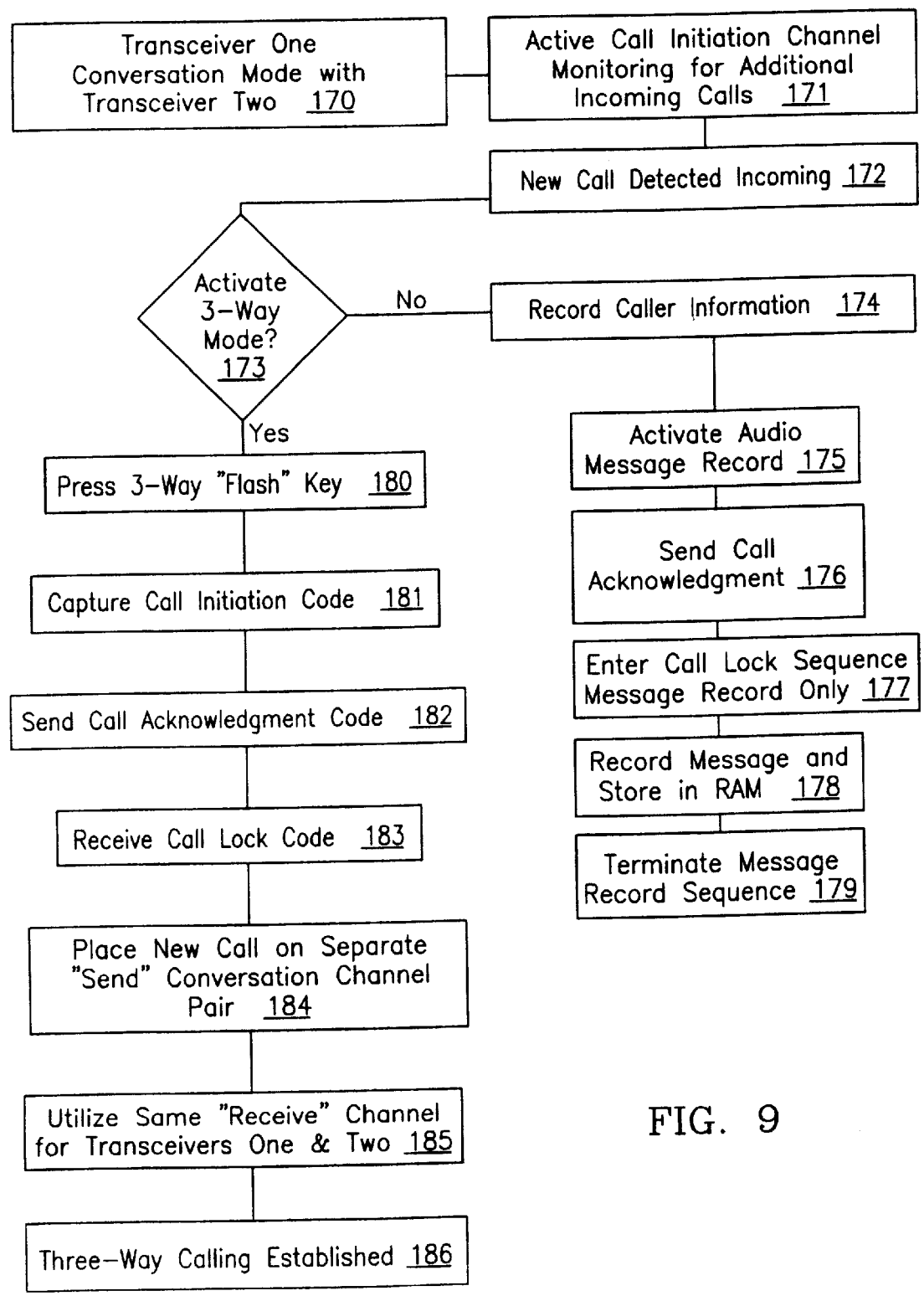
FIG. 9 shows a flowchart of the method of operation of three way calling in accordance with the present inventive concept.

Turning now to FIG. 9, a flowchart of the method of operation of three way calling is shown in accordance with the present inventive concept. Transceiver one is in conversation mode with transceiver two in the internal network 170. The transceiver initializes channel monitoring for incoming calls 171. When a new call is detected incoming 172 and three way mode is enabled at the transceiver 173, the user presses a three way flash key on the keypad of the transceiver 180. The transceiver captures the call initiation code 181 and sends a call acknowledgment code 182. A call lock code is received 183 and the new call is placed on a separate send conversation channel pair 184. The same receive channel is utilized for transceivers one and two 185 and three way calling is established 186. If three way mode is not enabled at the transceiver 173, the caller identification number is recorded if the transceiver supports this function 174. If the transceiver supports message recording, the audio message record function is activated 175. A call acknowledgment is sent 176 and a call lock sequence for message record is entered 177. The message is recorded and stored in the transceiver's RAM 178. Once the message has been recorded the message record sequence and the call are terminated 179.

Although the present invention has been described in considerable detail with reference to certain preferred embodiments thereof, other embodiments are possible. Therefore, the spirit and scope of the appended claims should not be limited to the description of the preferred embodiments herein.

What is claimed is:

1. A method of operating a local wireless communication system for transmitting and receiving voice and data signals comprising:

a. establishing an internal network with internal communication paths for transmitting and receiving signals within the local wireless communication system, the internal network comprising transceivers, the transceivers comprising mobile stations, fixed base stations and repeaters, wherein each transceiver can communicate directly with other transceivers in the internal network;

b. establishing an external communication path for linking the internal network to an external network for transmitting signals to and receiving signals from the external network, wherein each transceiver in the internal network can transmit signals to and receive signals directly from the external network;

c. utilizing a first frequency of a broadcast frequency pair for transmitting signals within the internal network and a second frequency of the broadcast frequency pair for receiving signals within the internal network; and d. remotely controlling the operational state of the entire internal network of transceivers in response to the receipt of an operational state command.

2. A method of operating a local wireless communication system, according to claim 1, wherein the operational state command that is received by the internal network is selected from the group consisting of on, off, standby and emergency.

3. A method of operating a local wireless communication system for transmitting and receiving voice and data signals comprising:

a. establishing an internal network with internal communication paths for transmitting and receiving signals within the local wireless communication system, the internal network comprising transceivers, the transceivers comprising mobile stations, fixed base stations and repeaters, wherein each transceiver can communicate directly with other transceivers in the internal network;

b. establishing an external communication path for linking the internal network to an external network for transmitting signals to and receiving signals from the external network, wherein each transceiver in the internal network can transmit signals to and receive signals directly from the external network;

c. utilizing a first frequency of a broadcast frequency pair for transmitting signals within the internal network and a second frequency of the broadcast frequency pair for receiving signals within the internal network; and d. remotely controlling the operational state of a selected group of transceivers within the internal network in response to the receipt of an operational state command selected from the group consisting of on, off, standby and emergency.

4. A method of operating a local wireless communication system for transmitting and receiving voice and data signals comprising:

a. establishing an internal network with internal communication paths for transmitting and receiving signals within the local wireless communication system, the internal network comprising transceivers, the transceivers comprising mobile stations, fixed base stations and repeaters, wherein each transceiver can communicate directly with other transceivers in the internal network;

b. establishing an external communication path for linking the internal network to an external network for transmitting signals to and receiving signals from the external network, wherein each transceiver in the internal network can transmit signals to and receive signals directly from the external network;

c. utilizing a first frequency of a broadcast frequency pair for transmitting signals within the internal network and a second frequency of the broadcast frequency pair for receiving signals within the internal network; and d. remotely controlling the operational state of an individual transceiver within the internal network in response to the receipt of an operational state command selected from the group consisting of on, off, standby and emergency.

5. A method of operating a local wireless communication system for transmitting and receiving voice and data signals comprising:

a. establishing an internal network with internal communication paths for transmitting and receiving signals within the local wireless communication system, the internal network comprising transceivers, the transceivers comprising mobile stations, fixed base stations and repeaters, wherein each transceiver can communicate directly with other transceivers in the internal network;

b. establishing an external communication path for linking the internal network to an external network for transmitting signals to and receiving signals from the external network, wherein each transceiver in the internal network can transmit signals to and receive signals directly from the external network;

c. utilizing a first frequency of a broadcast frequency pair for transmitting signals within the internal network and a second frequency of the broadcast frequency pair for receiving signals within the internal network; and d. remotely controlling the operational state of the entire internal network in response to the receipt of an operational state command;

e. remotely controlling the operational state of a selected group of mobile stations, fixed base stations and repeaters within the internal network in response to the receipt of an operational state command; and f. remotely controlling the operational state of an individual mobile station, fixed base station and repeater within the internal network in response to the receipt of an operational state command.

6. A method of operating a local wireless communication system, according to claim 1, wherein the operational state command that is received by the internal network is sent from within the internal network.

7. A method of operating a local wireless communication system, according to claim 1, wherein the operational state command that is received by the internal network is sent from the external network.

8. A method of operating a local wireless communication system, according to claim 1, the establishing an internal communication path within the local wireless system comprising transmitting signals directly from an originating mobile station to a destination mobile station and receiving signals directly from the destination mobile station at the originating mobile station.

9. A method of operating a local wireless communication system, according to claim 1, the establishing an internal communication path within the local wireless system comprising transmitting signals directly from the originating mobile station to a fixed base station and receiving signals from the fixed base station at the originating mobile station.

10. A method of operating a local wireless communication system, according to claim 1, the establishing an internal communication path within the local wireless system comprising transmitting signals directly from an originating fixed base station to a destination fixed base station and receiving signals from the destination fixed base station at the originating fixed base station.

11. A method of operating a local wireless communication system, according to claim 1, the establishing an internal communication path within the local wireless system comprising transmitting signals directly from the originating fixed base station to a repeater and receiving signals from the repeater at the originating fixed base station.

12. A method of operating a local wireless communication system, according to claim 1, the establishing an internal communication path within the local wireless system comprising transmitting signals directly from the originating mobile station to a repeater and receiving signals from the repeater at the originating mobile station.

13. A method of operating a local wireless communication system, according to claim 1, the establishing an internal communication path within the local wireless system comprising transmitting signals from a first repeater to a second repeater and receiving signals from the second repeater at the first repeater.

14. A method of operating a wireless communication system, according to claim 1, the establishing an internal communication path within the local wireless system comprising transmitting signals from the originating repeater to the originating mobile station and receiving signals from the originating mobile station.

15. A method of operating a local wireless communication system, according to claim 1, the establishing an internal communication path within the local wireless system comprising transmitting signals from the originating mobile station to the repeater, which in turn transmits signals to a destination mobile station and receiving signals at the originating mobile station from a destination mobile station via the repeater.

16. A method of operating a local wireless communication system, according to claim 1, the establishing an internal communication path within the local wireless system comprising:
   a. transmitting signals directly from an originating mobile station to a destination mobile station and receiving signals directly from the destination mobile station at the originating mobile station;
   b. transmitting signals directly from the originating mobile station to a fixed base station and receiving signals from the fixed base station at the originating mobile station;
   c. transmitting signals directly from an originating fixed base station to a destination fixed base station and receiving signals from the destination fixed base station at the originating fixed base station;
   d. transmitting signals directly from the originating fixed base station to a repeater and receiving signals from the repeater at the originating fixed base station;
   e. transmitting signals directly from the originating mobile station to a repeater and receiving signals from the repeater at the originating mobile station;
   f. transmitting signals from a first repeater to a second repeater and receiving signals from the second repeater at the first repeater; and
   g. transmitting signals from the originating repeater to the originating mobile station and receiving signals from the originating mobile station.

17. A method of operating a local wireless communication system, according to claim 1, the establishing an external communication path further comprising transmitting signals from an originating fixed base station to the external network and receiving signals from the external network at the originating fixed base station.

18. A method of operating a local wireless communication system for transmitting and receiving voice and data signals comprising:
   a. establishing an internal network with internal communication paths for transmitting and receiving signals within the local wireless communication system, the internal network comprising transceivers, the transceivers comprising mobile stations, fixed base stations and repeaters, wherein each transceiver can communicate directly with other transceivers in the internal network;
   b. establishing an external communication path for linking the internal network to an external network for transmitting signals to and receiving signals from the external network, wherein each transceiver in the internal network can transmit signals to and receive signals directly from the external network;
   c. utilizing a first frequency of a broadcast frequency pair for transmitting signals within the internal network and a second frequency of the broadcast frequency pair for receiving signals within the internal network; and
   d. transmitting signals from an originating mobile station to the external network via a repeater and receiving signals from the external network at the originating mobile station via the repeater.

19. A method of operating a local wireless communication system, according to claim 1, the establishing an internal communication path further comprising transmitting signals from an originating mobile station to the repeater, which in turn transmits signals to a destination mobile station, and receiving signals at the originating mobile station from a destination mobile station via the repeater.

20. A method of operating a local wireless communication system for transmitting and receiving voice and data signals comprising:
   a. establishing an internal network with internal communication paths for transmitting and receiving signals within the local wireless communication system, the internal network comprising transceivers, the transceivers comprising mobile stations, fixed base stations and repeaters, wherein each transceiver can communicate directly with other transceivers in the internal network;
   b. establishing an external communication path for linking the internal network to an external network for transmitting signals to and receiving signals from the external network, wherein each transceiver in the internal network can transmit signals to and receive signals directly from the external network;
   c. utilizing a first frequency of a broadcast frequency pair for transmitting signals within the internal network and a second frequency of the broadcast frequency pair for receiving signals within the internal network; and
   d. transmitting signals from an originating fixed base station to the external network and receiving signals from the external network at the fixed base station;
   e. transmitting signals from the repeater directly to the external network and receiving signals from the external network at the repeater; and
   f. transmitting signals from the origination mobile station to the repeater, which in turn transmits the signals to the external network and receiving signals at the originating mobile station from the external network via the repeater.

21. A method of operating a local wireless communication system, according to claim 20, wherein the external communications network is selected from the group consisting of a public switch telephone network, a paging network, a satellite network, and an emergency radio communication network.

22. A method of operating a local wireless communication system, according to claim 1, the establishing an internal communications path further comprising:
   a. transmitting signals from an originating mobile station to a destination mobile station via an intermediate transceiver in the internal network when the destination mobile station is out of transmission range of the originating mobile station and receiving signals from the destination mobile station at the originating mobile station via the intermediate transceiver;
   b. transmitting signals from an originating mobile station to a destination fixed base station via an intermediate transceiver in the internal network when the originating mobile station is out of transmission range of the originating station and receiving signals from the destination fixed base station at the originating mobile station via the intermediate transceiver; and
   c. transmitting signals from an originating fixed base station to a destination fixed base station via an intermediate transceiver in the internal network when the originating fixed base station is out of transmission range of the destination fixed base station and receiving signals from the destination fixed base station at the originating fixed base station via the intermediate transceiver.

23. A method of operating a local wireless communication system for transmitting and receiving voice and data signals comprising:

a. establishing an internal network with internal communication paths for transmitting and receiving signals within the local wireless communication system, the internal network comprising transceivers, the transceivers comprising mobile stations, fixed base stations and repeaters, wherein each transceiver can communicate directly with other transceivers in the internal network;

b. establishing an external communication path for linking the internal network to an external network for transmitting signals to and receiving signals from the external network, wherein each transceiver in the internal network can transmit signals to and receive signals directly from the external network;

c. utilizing a first frequency of a broadcast frequency pair for transmitting signals within the internal network and a second frequency of the broadcast frequency pair for receiving signals within the internal network; and d. transmitting signals from an originating mobile station to the external network via an intermediate transceiver in the internal network and receiving signals from the external network at the originating mobile station via the intermediate transceiver;

e. transmitting signals from an originating fixed base station to the external network via an intermediate transceiver in the internal network and receiving signals from the external network at the originating fixed base station via the intermediate transceiver; and f. transmitting signals from a repeater to the external communications network via an intermediate transceiver in the internal network and receiving signals from the external communications network at the repeater via the intermediate transceiver.

24. A method of operating a local wireless communication system, according to claim 22, wherein the intermediate transceiver is selected from the group consisting of a mobile station, a fixed base station and a repeater.

25. A method of operating a local wireless communication system, according to claim 23, wherein the intermediate transceiver is selected from the group consisting of a mobile station, a fixed base station and a repeater.

26. A method of operating a local wireless communication system, according to claim 1, the establishing of the external communication path further comprising utilizing a first broadcast frequency pair for transmitting and by utilizing the second frequency in the broadcast frequency pair for receiving.

27. A method of operating a local wireless communication system, according to claim 13, the transmitting from the first repeater to a second repeater further comprising transmitting signals over a land line connection.

28. A method of operating a local wireless communication system, according to claim 22, further comprising activating the intermediate transceiver in response to a coded signal generated by the originating mobile station, fixed base station and repeater.

29. A method of operating a local wireless communication system, according to claim 23, further comprising activating the intermediate transceiver in response to a coded signal generated by the originating mobile station, fixed base station and repeater.

30. A method of operating a local wireless communication system, according to claim 28, the activating the intermediate transceiver in response to a coded signal further comprising:

a. transmitting a coded signal and voice and data transmission from an originating mobile station, fixed base station and repeater;

b. receiving the coded signal and voice and data transmission at the intermediate transceiver whereby the intermediate transceiver rebroadcasts the signal to another mobile station, fixed base station and repeater within the internal network.

31. A method of operating a local wireless communication system, according to claim 27, the activating the intermediate transceiver in response to a coded signal further comprising:

a. transmitting a coded signal and voice and data transmission from an originating station;

b. receiving the coded signal and voice and data transmission at the intermediate transceiver whereby the intermediate transceiver rebroadcasts the signal to the external network.

32. A method of operating a local wireless communication system, according to claim 1, comprising the transceivers contain a data processor programmed to operate the transceiver in standby, call initiation, call receive and emergency mode.

33. A method of operating a local wireless communication system, according to claim 1, comprising:

a. initializing an originating transceiver in response to an operator entry command;

b. performing a local call initiating procedure if the operator entry command is for transmission within the internal network;

c. performing an external mode call initiating procedure if the operator entry command is for transmission to the external network.

34. A method of operating a local wireless communication system, according to claim 33, the performing the local call initiating procedure comprises:

a. transmitting a call initiation sequence from the originating transceiver, including the address of the originating transceiver and the address of a destination transceiver;

b. transmitting from the destination transceiver a call return sequence in response to the call initiation sequence; and c. transmitting from the originating transceiver a call lock sequence in response to the call return sequence and establishing voice or data communication between the originating transceiver and the destination transceiver within the internal network.

35. A method of operating a local wireless communication system, according to claim 1, wherein the external network comprises a paging system for transmitting paging signals from the external network directly to a transceiver in the internal network.

36. A method of operating a local wireless communication system, according to claim 30, wherein the coded signal comprises a boost code sent by a user of the originating mobile station, fixed base station and repeater.

37. A method of operating a local wireless communication system, according to claim 31, wherein the coded signal comprises a boost code sent by a user of the originating mobile station, fixed base station and repeater.

38. A method of operating a local wireless communication system, according to claim 1, comprising:

a. controlling the operational state of the transceiver by supplying power to the transceiver using a battery power supply;

b. encoding a serial number in a nonvolatile programmable memory embedded in the battery power supply;

c. performing a check by a microprocessor-based program residing in the transceiver, of the serial number of the battery with a transceiver serial number embedded in the transceiver; and d. allowing the mobile station, fixed base station and repeater to operate if the serial number in the battery matches the transceiver serial number.

39. A method of operating a local wireless communication system, according to claim 38, comprising reprogramming the serial number encoded in the battery pack to match the transceiver serial number.

40. A method of operating a local wireless communication system, according to claim 1, comprising:

a. controlling the operational state of the transceiver by checking a preprogrammed clock embedded within a microprocessor-based program residing in the transceiver; and b. allowing the transceiver to operate if the clock has not timed out.

41. A method of operating a local wireless communication system, according to claim 40, comprising remotely changing the preprogrammed clock of the transceiver upon receipt of a coded signal and clock update command in an operational state command received from within the internal network.

42. A method of operating a local wireless communication system, according to claim 41, comprising remotely changing the preprogrammed clock of the transceiver upon receipt of a coded signal and clock update command in an operational state command received from the external network.

43. A local wireless communication system comprising:

a. a wireless internal network with an internal communication path for transmitting and receiving signals within the local wireless communication system, the internal network comprising transceivers, the transceivers comprising mobile stations, fixed base stations and repeaters, wherein each transceiver can communicate directly with other transceivers in the internal network;

b. means for establishing an external communication path for linking the internal network to an external network for transmitting signals to and receiving signals from the external network, wherein each transceiver in the internal network can transmit signals to and receive signal directly from the external network;

c. means for utilizing a first frequency of a broadcast frequency pair for transmitting signals within the internal network and a second frequency of the broadcast frequency pair for receiving signals within the internal network;

d. means for remotely controlling the operational state of the entire network of transceivers in response to the receipt of an operational state command;

e. means for controlling the operational state of the transceiver by supplying power to the transceiver using a battery power supply;

f. means for encoding a serial number in a nonvolatile programmable memory embedded in the battery power supply;

g. means for performing a check by a microprocessor-based program residing in the transceiver, of the serial number of the battery with a transceiver serial number embedded in the transceiver; and h. means for allowing the transceiver to operate if the serial number in the battery matches the transceiver serial number.

44. A local wireless communication system, according to claim 43, comprising:

a. means for recharging the battery power supply;

b. the means for recharging contains a selected transceiver serial number stored in memory; and c. the means for recharging contains a microprocessor based program that checks the selected transceiver number with the serial number in the battery power supply and allows the battery to be recharged only if the numbers match.

45. A local wireless communication system, according to claim 43, comprising means for reprogramming the serial number encoded in the battery pack to match the transceiver serial number.

46. A local wireless communication system, according to claim 45, wherein the means for reprogramming the serial number comprises means for recharging the battery power supply when the serial number in the nonvolatile programmable memory embedded in the battery power supply matches the serial number embedded in the transceiver.

47. A local wireless communication system comprising:

a. a wireless internal network with an internal communication path for transmitting and receiving signals within the local wireless communication system, the internal network comprising transceivers, the transceivers comprising mobile stations, fixed base stations and repeaters, wherein each transceiver can communicate directly with other transceivers in the internal network;

b. means for establishing an external communication path for linking the internal network to an external network for transmitting signals to and receiving signals from the external network, wherein each transceiver in the internal network can transmit signals to and receive signal directly from the external network;

c. means for utilizing a first frequency of a broadcast frequency pair for transmitting signals within the internal network and a second frequency of the broadcast frequency pair for receiving signals within the internal network;

d. means for remotely controlling the operational state of the entire network of transceivers in response to the receipt of an operational state command;

e. means for controlling the operational state of the transceiver by checking a preprogrammed clock embedded within a microprocessor-based program residing in the transceiver; and f. means for allowing the transceiver to operate if the clock has not timed out.

48. A local wireless communication system, according to claim 47, further means for remotely changing the preprogrammed clock of the transceiver upon receipt of a coded signal and clock update command in an operational state command received from within the internal network.

49. A local wireless communication system, according to claim 48, comprising means for remotely changing the preprogrammed clock of the transceiver upon receipt of a coded signal and clock update command in an operational state command received from the external network.

50. A method of operating a local wireless communication system, according to claim 1, comprising establishing a three way calling communication path between three transceivers within the internal network.

* * * * *